United States Patent
Tuomainen et al.

(10) Patent No.: US 7,020,102 B2
(45) Date of Patent: Mar. 28, 2006

(54) METHOD FOR REDUCING THE POWER CONSUMPTION OF A MOBILE STATION

(75) Inventors: Juha Tuomainen, Tampere (FI); Jarkko Oksala, Tampere (FI); Jari Ruohonen, Tampere (FI)

(73) Assignee: Nokia Mobile Phones Ltd., Espoo (FI)

( * ) Notice: Subject to any disclaimer, the term of this patent is extended or adjusted under 35 U.S.C. 154(b) by 813 days.

(21) Appl. No.: 09/730,160

(22) Filed: Dec. 5, 2000

(65) Prior Publication Data

US 2001/0015963 A1    Aug. 23, 2001

(30) Foreign Application Priority Data

Dec. 8, 1999    (FI)    ............................. 19992635

(51) Int. Cl.
*G08C 17/00*    (2006.01)

(52) U.S. Cl. ......................................... 370/311; 455/434

(58) Field of Classification Search ................ 370/311, 370/252, 352; 455/574, 434
See application file for complete search history.

(56) References Cited

U.S. PATENT DOCUMENTS

| | | | |
|---|---|---|---|
| 5,392,287 A | | 2/1995 | Tiedemann, Jr. et al. .. 370/95.1 |
| 5,574,996 A | | 11/1996 | Raith ....................... 455/161.3 |
| 5,918,170 A | | 6/1999 | Oksanen et al. ............ 455/343 |
| 6,108,542 A | * | 8/2000 | Swanchara et al. ......... 455/434 |
| 6,119,024 A | * | 9/2000 | Takayama ................... 455/574 |
| 6,449,494 B1 | * | 9/2002 | Cashman ................. 455/553.1 |
| 6,463,054 B1 | * | 10/2002 | Mazur et al. ............... 370/352 |
| 6,680,920 B1 | * | 1/2004 | Wan .......................... 370/311 |

FOREIGN PATENT DOCUMENTS

| | | |
|---|---|---|
| WO | WO 95/12932 | 5/1995 |
| WO | WO 97/15154 | 4/1997 |
| WO | WO 98/42112 | 9/1998 |
| WO | WO 99/03295 | 1/1999 |
| WO | WO 99/17579 | 4/1999 |
| WO | WO 99/33306 | 7/1999 |

* cited by examiner

*Primary Examiner*—Bob Phunkulh
*Assistant Examiner*—Robert W. Wilson
(74) *Attorney, Agent, or Firm*—Perman & Green, LLP (57) ABSTRACT

The invention relates to a method for reducing the power consumption of a mobile station (2) connected to a packet-switched network (4), in which packet-switched network information is sent in the form of data frames. In the method, a paging period is specified for the mobile station for sending paging messages (UD1) essentially at the intervals of said paging period to the mobile station, the mobile station (2) is set to the standby mode at least for the time of the reception of the paging messages (UD1), and the mobile station, which is in the standby mode, is set to the idle mode after the reception of the paging message (UD1). In the idle mode, some of the functions of the mobile station (2) are set to the power saving mode or switched off. In the method, the mode of operation of the mobile station in the idle mode is changed from the idle mode to the standby mode to receive information transmitted in the packet-switched network either at intervals during the paging period for maintaining synchronization to the packet-switched network, or at the end of the paging period for performing synchronization to the packet-switched network again.

18 Claims, 7 Drawing Sheets

METHOD FOR REDUCING THE POWER CONSUMPTION OF A MOBILE STATION

FIELD OF THE INVENTION

The present invention relates to a method for reducing the power consumption of a mobile station, a system and a mobile station.

BACKGROUND OF THE INVENTION

Figure 1:
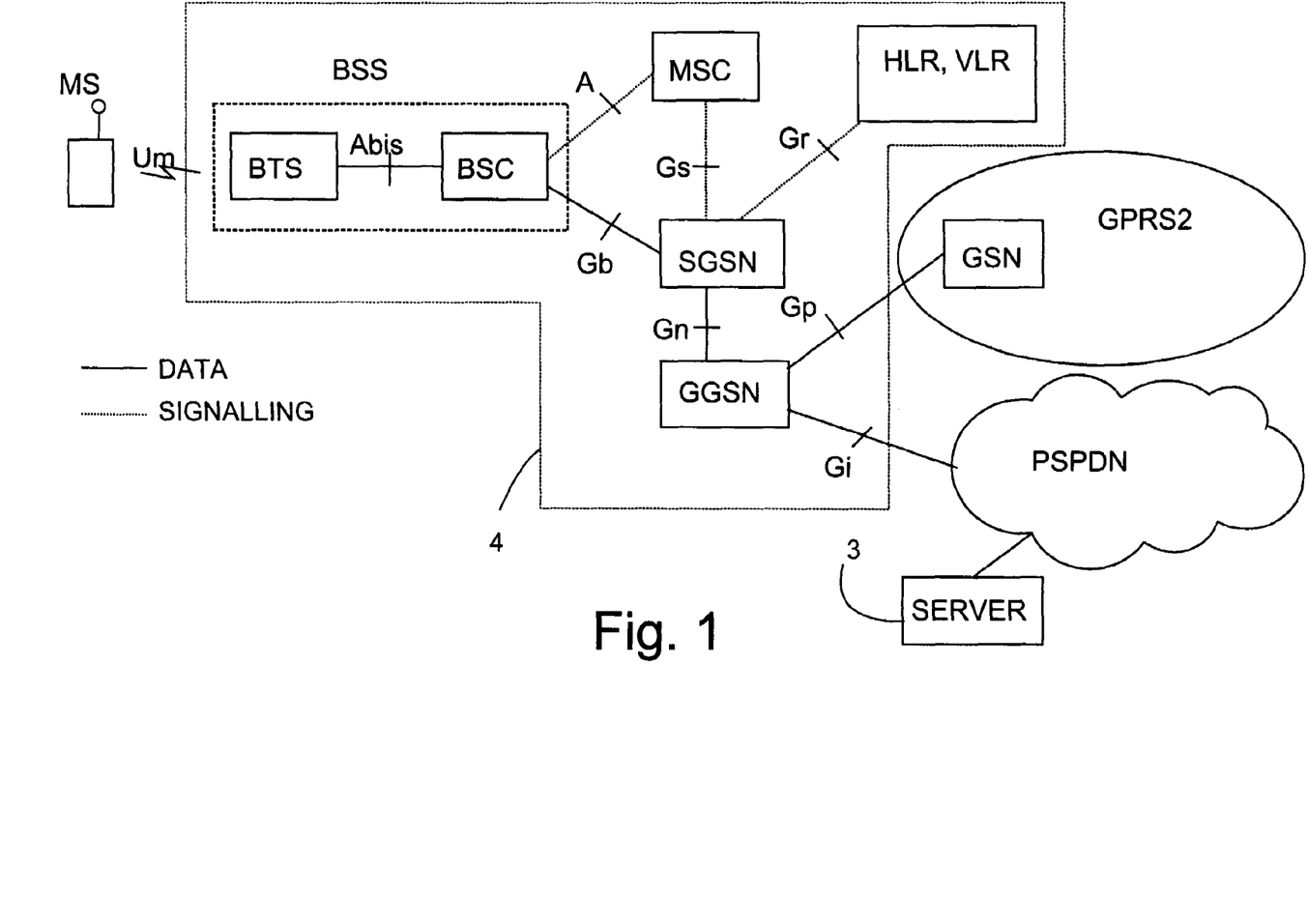
FIG. 1 illustrates the logical structure of the GPRS system as a simplified block diagram.

Data transfer between different data transfer devices can be arranged so that the data transfer devices, between which information is to be transferred, are connected for the time needed for data transfer. This so-called circuit switched connection is maintained until the user stops the data transfer. In these cases, most of the connection time is used for feeding the commands given by the user, and only a small part of the time is used for actual data transfer. This limits, among other things, the maximum number of simultaneous users of the same application. Another possibility is to use so-called packet-switched data transfer. This means that information is transferred between data transfer devices in packet form, whereby the time between packets is freely available for other data transfer devices. In that way, the number of simultaneous users can be increased especially in wireless data transfer networks, such as cellular networks, because then the mobile stations in the area of the same cell can use the same transmission channel. A well known cellular communication system is the GSM system, for which a packet transmission service called GPRS (General Packet Radio Service) has been developed. The blocks that are of central importance for the operation of the GPRS system are shown as a block diagram in FIG. 1. The Serving GPRS Support Node (SGSN) controls the operation of the packet switching service on the side of the cellular network. The serving GPRS support node takes care of the attachment to and detachment from the network of the mobile-station 2, updating the location of the mobile station 2 and directing the data packets to the right addresses. The mobile station 2 is connected to the base station subsystem BSS via a radio interface Um (FIG. 1). The base station system is connected to the serving GPRS support node SGSN via a BSS-SGSN interface Gb. In the base station subsystem BSS, the base transceiver station BTS and the base station controller BSC are interconnected by a BTS-BSC interface called Abis. The serving GPRS support nodes SGSN can communicate with other serving GPRS support nodes SGSN by means of the Gateway GPRS Support Node (GGSN).

Figure 2:
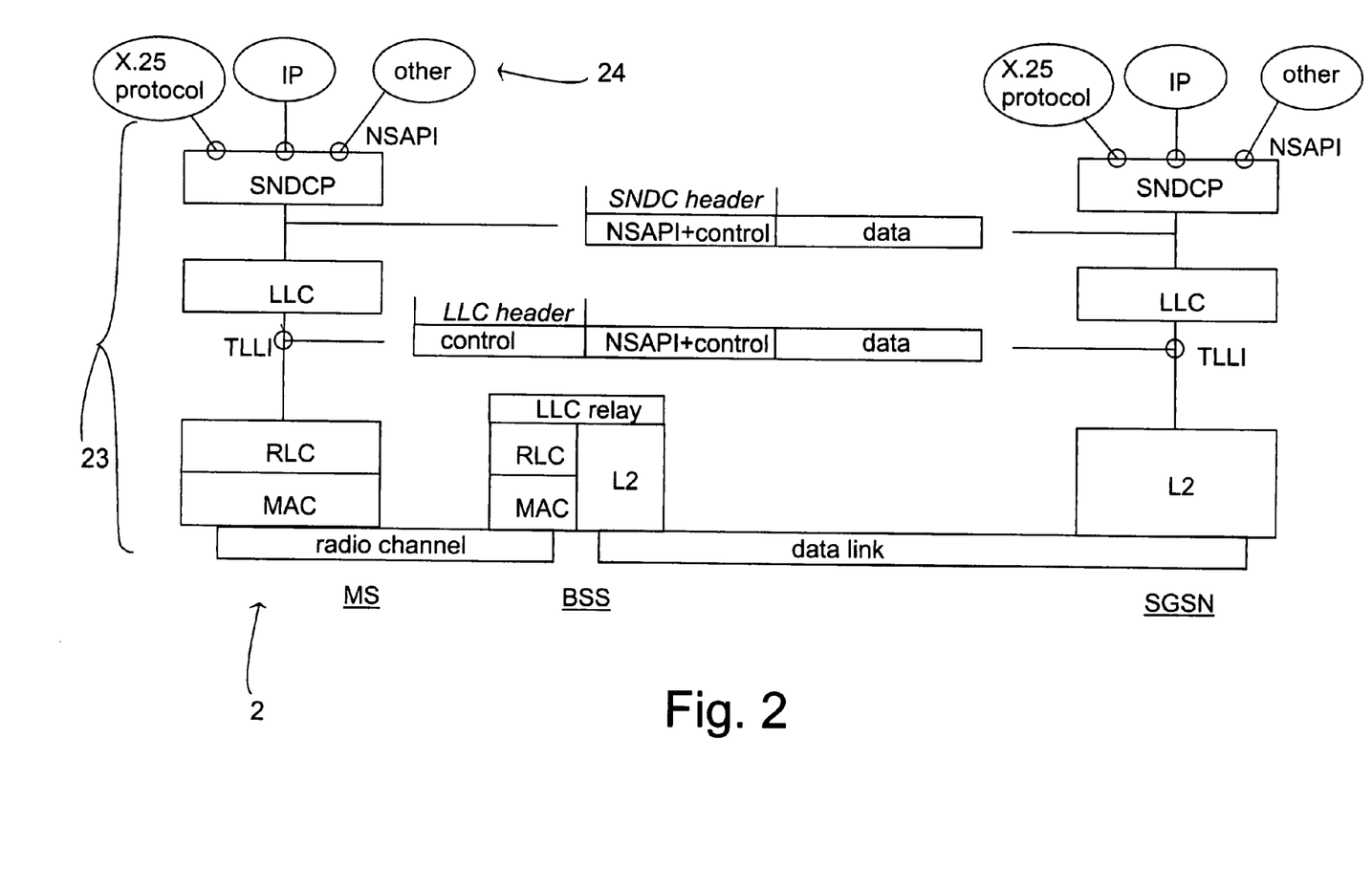
FIG. 2 illustrates the layered structure of the GPRS system and the data frame structure of the layers in a simplified manner.

The operation of both the mobile station 2 and the serving GPRS support node SGSN can be divided into several layers, each of which has a different function, as shown in FIG. 2.

The transfer of information, such as control signalling and information sent by the user, between the mobile station 2 and the serving support node SGSN preferably takes place in the form of data frames. The data frame of each layer consists of a header field and a data field. FIG. 2 also shows the structure of the data frames used in the GPRS system in different layers.

The information contained by the data field can be, for example, information fed by the user of the mobile station or signalling information. The functional tasks of the layers of the GPRS system are shown in the following.

Lowest in the Data Link Layer is the MAC (Media Access Control) layer, which takes care of using the radio path in communications between the mobile station 2 and the Base Station Subsystem), such as allocating the channels for transmission and reception of packets.

A time division/frequency division multiple access (TDMA/FDMA) method according to the GSM system is used in the physical layer (radio path) in the GPRS system. The basic transmission unit is called a burst, which consists of a certain number of bits sent to the radio path. The length of a burst is 15/26 ms, or approx. 0.577 ms. The radio path is also divided into channels, in which the difference between the medium frequencies is 200 kHz in the GPRS/GSM system.

Figure 5A:
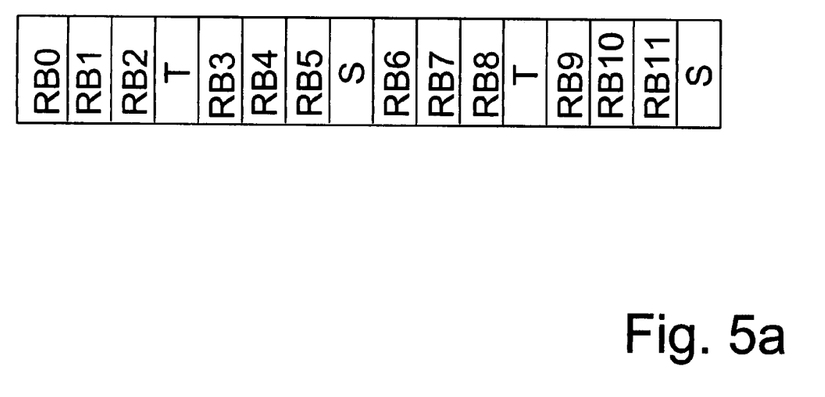
FIG. 5a illustrates the multiframe structure according to the GPRS system in a simplified manner.

Eight bursts or time slots constitute one TDMA frame. These frames are combined to form a larger 52-multiframe, which comprises 52 TDMA frames. FIG. 5a illustrates the structure of such a multiframe as a simplified diagram. These multiframes are used in the implementation of logical channels. The multiframe is divided into 12 radio blocks (RB0–RB11), each of which includes four TDMA frames. One radio block is needed to send one RLC/MAC frame. In addition, the multiframe includes two so-called search frames (S), during which the base station of the cell does not send on the logical packet data channel (PDCH). Then the mobile stations in the area of the cell can perform measurements of the signal strength and interference of the base stations of the adjacent cells. The remaining two frames are reserved for the transmission (T) of the Packet Timing Advance Channel (PTACH).

Logical channels have been formed in the GPRS system for various purposes of signalling and transmission of data packets. Of these logical channels the following may be mentioned in this context: PCCCH (Packet Common Control Channel), PBCCH (Packet Broadcast Control Channel), PDTCH (Packet Data Traffic Channel), PACCH (Packet Associated Control Channel) and PTACH (Packet Timing Advance Channel). The PCCCH channel is used, for instance, during a packet-switched connection to request transmission periods from the base station for the transmission of packets, to inform of the granted periods to the mobile station, to send search messages etc. In the PBCCH channel, the base station sends system information of the packet system to the mobile-station. The transmission of data packets is carried out in the PDTCH channel. The PACCH channel is used for the transmission of signalling information related to the transfer of packets (acknowledgements, measurement information and reports). The PTACH channel is used in connection with timing for evaluating different delays.

In the transmission stage, the bits formed from the packets, possibly coded, are not transferred to the bursts as such, but they are interleaved and matched at first. By interleaving, the bits are divided into four bursts so that bits of one byte % are not all placed in the same burst, but preferably in all four bursts in a certain order. This order of interleaving is known in the receiver, and thus it is possible to return the order of the bits. The purpose of matching is to place the interleaved bits in the desired points in each burst so that bits remain in the bursts for other purposes (stealing bits), such as for transmitting channel coding information or other control information.

Data transfer on the lowest level between the base station subsystem BSS and the serving GPRS support node is carried out in the L2 layer (data link layer), in which a link layer protocol, such as the known LAPD protocol, frame relay protocol or the like is used. The L2 layer can also include quality or routing information according to the GPRS specifications. The L2 layer has properties of the physical layer and data link layer of the OSI model.

Above the MAC layer, there is the RLC layer (Radio Link Control), the purpose of which is to divide the data frames formed by the LLC layer into packets of a certain length that can be sent to the radio path (PDU, Protocol Data Unit), to transmit them and retransmit them, when necessary. The length of the packets in the GPRS system is the length of one GSM time slot (approx. 0.577 ms).

The LLC layer (Logical Link Control) offers a reliable data transfer link between the mobile station 2 and the serving GPRS support node SGSN. Among other things, the LLC layer adds error check information to the message to be transmitted. Based on this information, incorrectly received messages can be attempted to correct, and the message can be retransmitted, when necessary. In addition, the encryption and decryption of the information is carried out in the LLC layer.

The functions carried out in the SNDCP layer (Sub-Network Dependent Convergence Protocol) include protocol changes of the information to be transmitted, compressing, segmentation and the segmentation of messages coming from an upper level. FIG. 2 also shows the structure of a SNDCP frame. The SNDCP frame comprises a SNDCP header field and a SNDCP data field. The SNDCP header field consists of protocol information (Network Service Access Point Identity, NSAPI) and SNDCP control information, such as compressing, segmentation and encryption specifications. The SNDCP layer functions as a protocol adapter between the protocols used on the upper level and the protocol of the LLC layer (data link layer).

The information to be transmitted comes preferably as data packets according to a suitable protocol, such as Packet Data Protocol (PDP), to the SNDCP layer from an application, like messages according to the X.25 protocol or the Internet protocol (IP). The application can be, for example, a data application of a mobile station, a telefax application, a computer program, which has a data transfer connection to a mobile station, etc.

The SNDCP frame is transferred to the LLC layer, where an LLC header field is added to the frame. The LLC header field consists of, for example, the LLC control part, which defines the number of the frame and the type of the command (info, acknowledgement, retransmission request, etc.) In connection with the attachment to the GPRS packet network, the mobile station sends an attach request message to the serving GPRS support node. On the basis of the International Mobile Station Identity (IMSI) of the mobile station, the serving GPRS support node can retrieve information from the home location register HLR corresponding to the mobile station in question, whereby the serving GPRS support node can use this information to select a Temporary Logical Link Identity (TLLI) for a data transfer connection. If the mobile station has used a TLLI before, it can transmit the TLLI in a request message, whereby the serving GPRS support node can give this TLLI to the mobile station again, or allocate a new TLLI to it. The serving GPRS support node SGSN transmits the selected TLLI to the mobile station for use in a data transfer connection between the mobile station and the serving GPRS support node. This TLLI is used in data transfer to determine to which data transfer connection each message belongs. The same TLLI may not be in use simultaneously in more than one data transfer connection. When the connection has terminated, the TLLI used in the connection can be given to a new connection to be established.

The operator of the packet-switched network has divided the cells of the packet-switched network into Routing Areas, which can be used in determining the location of the mobile station 2. Each routing area comprises one or several cells. Then the Mobility Management operations of the mobile station are used to keep record of the location and connection status of the mobile stations in the operation area of the packet-switched network. These records are maintained both in the mobile station and the packet-switched network, preferably in the serving GPRS support node SGSN. In the GSM system, the base station, which has a communications connection to the mobile station 2, is changed in connection with the reselection of a cell.

When a mobile station 2 is synchronized to the transmission of a cell in connection with start-up or when a mobile station moves to the area of another cell, the base station BTS sends information concerning, for example, the way that in which the logical channels in the area of the cell in question are arranged in physical channels, or in which radio block and time slot of the multiframe information of each logical channel is transmitted.

The packet system divides the mobile stations 2 in the area of the cell into so-called paging groups. Paging messages are then sent to each paging group in a certain radio block of the PCCCH channel. In the GPRS system, the division into paging groups is advantagely based on the International Mobile Subscriber Identity, the number of paging channels available in a cell and the number of paging blocks available in the paging channel.

In Code Division Multiple Access (CDMA) based cellular networks it is possible to communicate to the mobile station 2 via several base stations simultaneously. The base stations transmit a spread spectrum signal on a so-called pilot channel, whereby a mobile station can conclude on the basis of these pilot signals, which base station sends the best signal for communication. The base stations which are currently communicating with the mobile station 2 form a so-called active set. The movement of the mobile station by means of the packet-switched network of the CDMA system can be concluded from the changing of these active sets.

A mobile station in a GPRS system can have, among other things, the three following connection modes in relation to the packet-switched network: an idle mode (IDLE), a standby mode (STANDBY) and an active mode (READY). In the idle mode, the mobile station is not connected to the mobility management of the network and in which case the mobile station is not able to communicate with the network. The mobility management information of the mobile station 2 and the mobility management information of the serving GPRS support node concerning the mobile station 2 in question is not necessarily up to date, if the mobile station has moved to the area of another cell while in the idle mode. When required, the mobile station 2 performs the selection and reselection of a cell in the Public Land Mobile Network (PLMN) and the packet-switched network. In relation to the packet-switched network, a mobile station 2 in the idle mode is not connected to the network In the active mode the mobile station is connected to the mobility management of the packet-switched network, the location of the mobile station is known in the packet-switched network within the accuracy of a cell, and the mobile station can both send and receive data packets. The selection and reselection of a cell in the packet-switched network is performed by either the mobile station 2, or the packet-switched network can control the selection of a cell. The header field of the Base Station Subsystem GPRS Protocol (BSSGP) packet includes the cell identification information. In a system based on the packet-switched network described here the purpose of the GPRS protocol level of this base station subsystem is to transmit information related to the routing and the Quality of Service (QoS) between the Base Station Subsystem (BSS) and the serving GPRS support node SGSN.

In the active mode, the mobile station is connected to the mobility management of the packet-switched network, but the mobile station cannot send or receive data packets. The location of the mobile station in the packet-switched network is known only within the accuracy of the routing area. The reception of paging requests from the serving GPRS support node for cell selection, (CS) services is possible. Changing from the active mode to the standby mode can be done when, for example, a sufficiently long time has passed since the transmission of the last data packet between the mobile station and the packet-switched network. A mobile station 2 in the standby mode can start either activation or deactivation of a packet-switched connection (PDP). The status of the packet-switched connection must be updated before sending or receiving data packets. If a packet-switched connection has been activated, the serving GPRS support node can receive packets. Then the serving GPRS support node SGSN sends a paging request to the routing area where the mobile station 2 is located. When the mobile station 2 sends a reply message to this request, the connection mode of the mobile station 2 is changed into the active mode. The connection mode of the serving GPRS support node SGSN is changed into the active mode after the serving GPRS support node SGSN has received a reply message to a paging request from the mobile station 2. The connection mode of the mobile station 2 is changed from the standby mode to the active mode also when the mobile station sends data packets or signalling information to the serving GPRS support node SGSN. In a corresponding manner, in the serving GPRS support node SGSN the change of the connection mode from the standby mode to the active mode is also done in the situation in which the SGSN receives data packets sent by the mobile station 2, or the SGSN receives signalling information.

The mobile station receives paging messages from the base station which the mobile station is listening to at the time. The mobile station can find out from these paging messages whether there are transmissions coming to it from the base station. The time between two consecutive paging messages is called a DRX period (discontinuous reception). Later in this specification, this DRX period will be called a paging period. During a paging period, the mobile station can set itself to a power saving mode for a certain time, because it does not expect to be getting any transmissions from the mobile communication network. Such a discontinuous reception mode (DRX mode) is allowed for a mobile station, which is in a standby mode in all other times except when the mobile station is performing cell selection functions. The length of the period can vary, and the mobile station receives parameter information from the base station. The mobile station can calculate on the basis of the received parameter information when the next paging message can be expected. Because the mobile station is synchronized to the base station transmission, the mobile station knows the transmission time of the next paging message. A discontinuous reception mode like this enables switching all possible functional blocks connected with the radio interface off when they are not needed. Functional blocks like this are, for example: the radio part, the baseband part, which preferably also comprises a digital signal processing unit, and a system oscillator used in the radio interface functions. The purpose of this arrangement is to reduce the overall power consumption of the mobile station.

However, the mobile station must change from the idle mode back to the standby mode at times for receiving the above mentioned paging messages, for example. In the GPRS system, the maximum length of the idle mode is specified as a time corresponding to 64 52-multiframes, or approx. 15 s. Then the maximum delay for establishing a connection with the mobile station is approx. 15 seconds. However, in practical applications the maximum length of the idle state is made much shorter, nine 52-multiframes, or approx. two seconds, because of the specifications of the GSM system and the fact that the frequency stability of an oscillator used in the idle state may not be sufficient to keep the mobile station synchronized to the mobile communication network. If a prior art mobile station does not keep synchronization to the mobile communication network during the idle mode, this can mean that the mobile station cannot receive the next paging message. On the other hand, the power consumption of a mobile station is generally the higher the shorter the idle period is.

SUMMARY OF THE INVENTION

It is an objective of the present invention to provide a method for reducing power consumption in a mobile station, a system in which the method is applied, and a mobile station.

According to a first aspect of the present invention there is provided a method for reducing the power consumption of a mobile station connected to a packet-switched network, in which packet-switched network information is transmitted in the form of data frames, and the method comprising:
specifying a paging period for a mobile station for sending paging messages essentially at the intervals of said paging period to the mobile station to enable to synchronize the mobile station with the packet-switched network;
setting the mobile station in the standby mode at least for the time of the reception paging messages, and after the reception of the paging message;
setting the mobile station, which is in the standby mode, to the idle mode, in which idle mode part of the functions of the mobile station are set in one of the following states:
the power saving mode,
switched off,
wherein, to receive information transmitted in the packet-switched network, the method further comprises changing the mode of operation of the mobile station from the idle mode to the standby mode according to one of the following alternatives:
at intervals during the paging period to receive information transmitted in the packet-switched network for maintaining synchronization to the packet-switched network; or
at the end of the paging period to receive information transmitted in the packet-switched network for resynchronizing the mobile station to the packet-switched network.

According to a second aspect of the present invention there is provided a system which comprises:
a packet-switched network;
at least one mobile station having a data transfer connection with the packet-switched network;
means for sending information in the form of data frames between the mobile station and the packet-switched network;
means for specifying the paging period, whereby paging messages are arranged to be sent essentially at the intervals of said paging period to the mobile station to enable to synchronize the mobile station with the packet-switched network;

means for setting the mobile station to the standby mode at least for the time of the reception of the paging messages;
means for setting the mobile station, which is in the standby mode, to the idle mode after the reception of the paging message; and
means for setting some of the functions of a mobile station in the idle mode to one of the following states:
the power saving mode;
switched off,
means for changing the mode of operation of a mobile station, which is in the idle mode, from the idle mode to the standby mode, wherein the means for changing the mode of operation of a mobile station are adapted to change the mode of operation according to one of the following alternatives:
at intervals during the paging period to receive information transmitted in the packet-switched network for maintaining a synchronization to the packet-switched network when the mobile station is synchronized to the packet-switched network, or
at the end of the paging period to receive information transmitted in the packet-switched network for performing a resynchronization to the packet-switched network when the mobile station is not synchronized to the packet-switched network.

According to a third aspect of the present invention there is provided a mobile station comprising:
means for establishing a data transfer connection to the packet-switched network,
means for specifying the paging period,
a receiver for receiving whereby paging messages which are arranged to be sent essentially at the intervals of said paging period from the packet-switched network to the mobile station to enable to synchronize the mobile station with the packet-switched network,
means for setting the mobile station to the standby mode at least for the time of the reception of the paging messages
means for setting the mobile station, which is in the standby mode, to the idle mode after the reception of the paging message, and
means for setting some of the functions of a mobile station in the idle mode to one of the following states:
the power saving mode,
switched off,
means for changing the mode of operation of a mobile station, which is in the idle mode, from the idle mode to the standby mode, wherein the means for changing the mode of operation of a mobile station are adapted to change the mode of operation according to one of the following alternatives:
at intervals during the paging period to receive information transmitted in the packet-switched network for maintaining synchronization to the packet-switched network when the mobile station is synchronized to the packet-switched network, or
at the end of the paging period to receive information transmitted in the packet-switched network for performing synchronization to the packet-switched network again when the mobile station is not synchronized to the packet-switched network.

The present invention provides considerable advantages as compared to the prior art solutions, packet-switched networks and mobile stations. The method according to the invention reduces the power consumption of the mobile station, because the period when the radio interface functions are on can be shortened in the standby mode. In addition, it is not necessary for the mobile station to perform measurements as often as it is required in the prior art mobile stations during the idle mode.

DESCRIPTION OF THE DRAWINGS

In the following, the invention will be described in more detail with reference to the accompanying drawings, in which.

DETAILED DESCRIPTION OF THE INVENTION

In the following, the invention is described with reference to the packet-switched service GPRS implemented in the GSM system, but the invention is not limited to this system only. The invention can also be applied in the UMTS system being developed, and in other third generation mobile communication systems.

Figure 6:
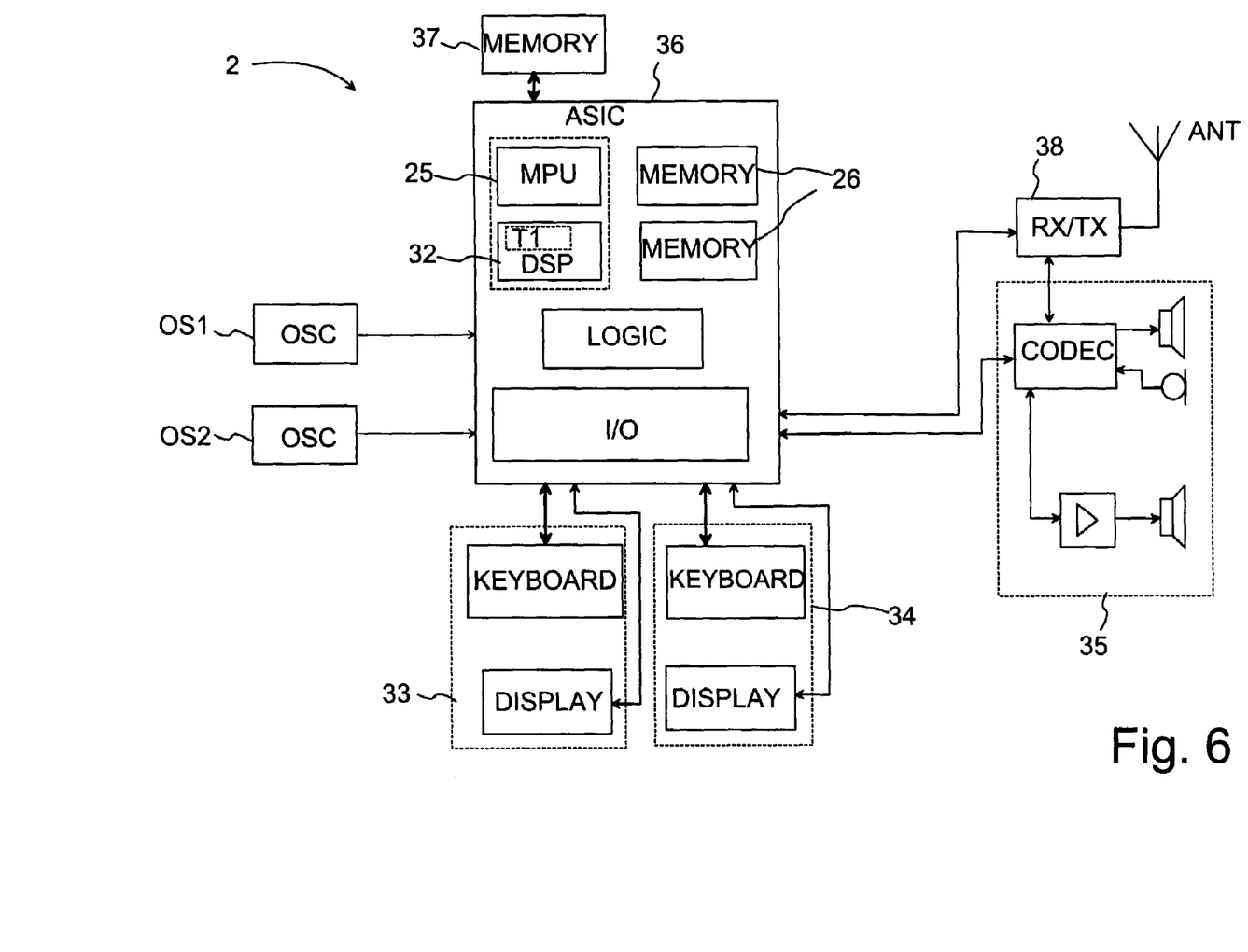
FIG. 6 shows a mobile station according to a preferred embodiment of the invention as a simplified block diagram.

FIG. 6 shows a simplified block diagram of a mobile station 2 according to a preferred embodiment of the invention. The mobile station 2 preferably comprises mobile station functions and data processing functions, for which the mobile station 2 can have dedicated user interfaces 33, 34. In order to arrange data transmission to the mobile communication network 4, the mobile station 2 comprises a high-frequency part 38, which includes, among other things, a transmitter (not shown) and a receiver. The mobile station 2 also includes audio devices 35, such as an earphone and a microphone. In a mobile station 2 according to FIG. 6, the processor 25 (MPU) and the digital signal processing unit 32 (DSP) are implemented by means of an Application Specific Integrated Circuit (ASIC) 36. An ASIC circuit 36 also comprises other functions, such as control logic (LOGIC), memory 26 (MEMORY) and input/output logic (I/O). The memory devices 26 of at he mobile station 2 can also comprise external memory 37. The clock signals and the like needed in the operation of the mobile station 2 are generated with the first oscillator OS1 and/or the second oscillator OS2.

Figure 7:
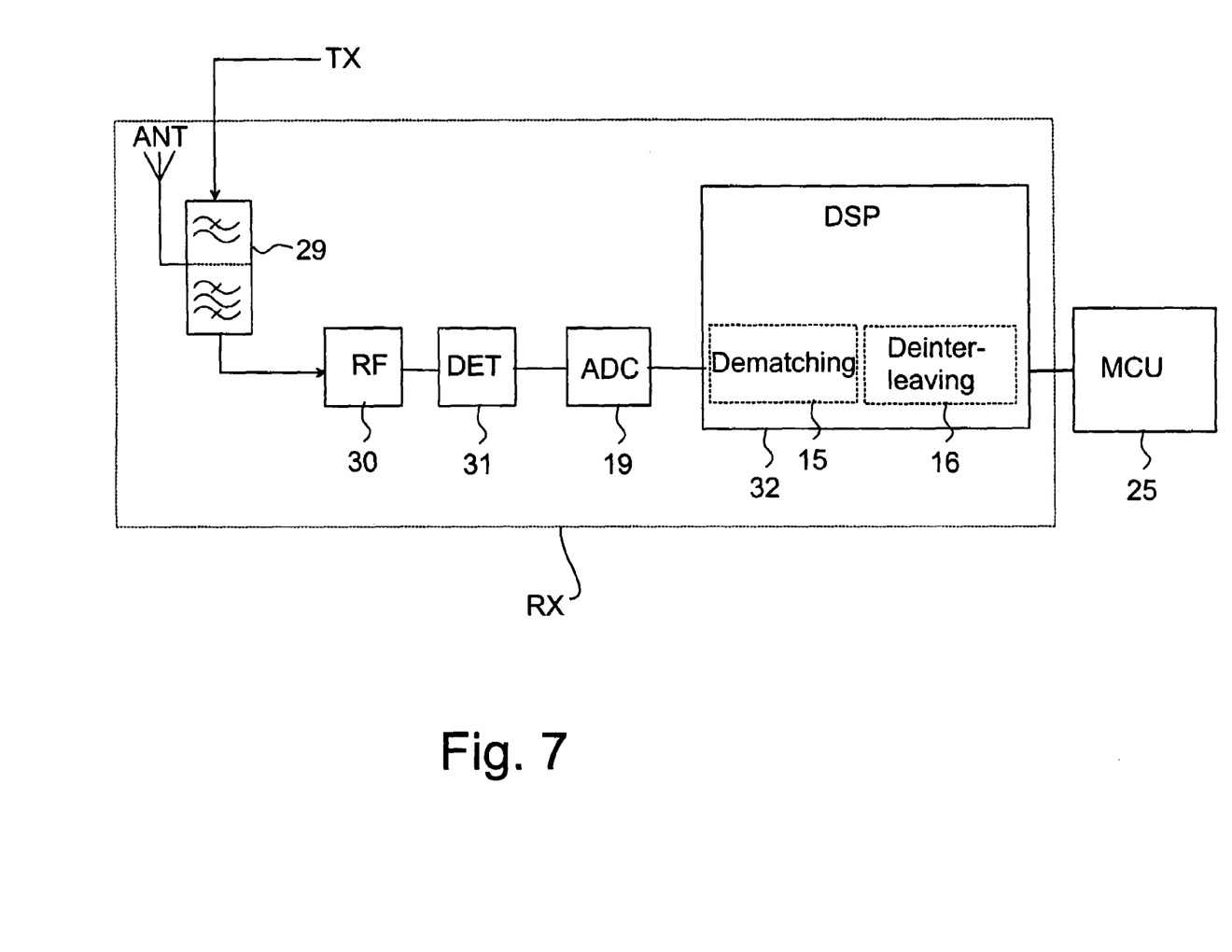
FIG. 7 shows a simplified block diagram of a receiver, which can be used in connection with the mobile station according to the invention.

FIG. 7 also shows a simplified block diagram of a receiver RX, which can be used in connection with the mobile station 2 according to the invention. In the receiver RX, signals are received with an antenna ANT and conducted via an antenna switch 29 to the pre-stage 30 of the receiver, in which pre-stage the received signal is, among other things, bandpass filtered and transformed either as direct transformation or via one or more intermediate frequencies to a baseband signal. The transformation is carried out in a manner known as such by mixing one or more local oscillator frequencies to the received signal. The local oscillator frequencies are generated preferably with the first oscillator OS1 in the standby mode and preferably with the second oscillator OS2 in the active mode.

The signal received from the pre-stage 30 is conducted for detection to the detector 31. The detector 31 forms an analog signal, which is converted to a digital signal in the Analog-to-Digital Converter (ADC) 19. After this, the digitized signal is conducted to the digital signal processing unit 32.

In the digital signal processing unit 32, it is also possible to calculate the strength of the received signal on the basis of the detected signal formed by the detector 31. For measuring the signal-to-noise ratio (SNR), the strength of the noise and other interfering signals is preferably also measured in addition to the strength Rx of the received signal, whereby the signal-to-noise ratio is obtained as the ratio of these measurement results. The strength of the noise can be measured in an idle period, for example, preferably in the idle period preceding the reception period. The processor 25 of the mobile station then gives the digital signal processing unit 32 the information that the received signal is not a useful signal but a spurious signal. Then the digital signal processing unit 32 calculates the strength of the noise on the basis of the signal formed by the detector 31, whereby the signal-noise ratio SNR can also be calculated. Obviously the strength of the received signal Rx and the signal-to-noise ratio SNR can also be determined with other methods known as such than the ones described here.

In the reception mode, e.g. during the active mode or the standby mode, the receiver RX of the mobile station 2 thus listens with the reception channel, which the base station subsystem BSS has notified to the mobile station 2. The mobile station 2 receives bursts and carries out operations that are reverse to the transmission stage. The bursts are demodulated in a demodulator 31, whereby a demodulated bit string is formed. The next step is to remove the matching of the data bits in the dematching block 15. The interleaving is removed in the deinterleaving block 16, whereby there is a bit string in the output of the deinterleaving block 16 corresponding to the coded and possibly clipped bit string of the transmission stage in errorless reception.

When the bit string has been decoded, the reconstructed frame of the radio connection can be moved in the mobile station 2 to upper levels in the protocol stack 23, in a manner known as such, whereby the received information is available for the application 24.

The so-called GPRS attach signalling is performed when the mobile station 2 attaches to the packet-switched network, after switching on, for example. This is also performed when the mobile station changes from the idle mode to the active mode. The purpose of the GPRS attach is, among other things, to inform the packet-switched network 4 of the readiness of the mobile station 2 to packet-switched connections, and to select a suitable paging period. This selection of the paging period can preferably be carried out so that the mobile station 2 selects a paging period, preferably the maximum (64 multiframes). Information of the selected paging period is sent from the mobile station 2 in an ATTACH_REQUEST message to the packet-switched network 4, where it is examined whether the suggested paging period can be taken into use. If the packet-switched network 4 supports the suggested paging period, it sends information about this (SPLIT_PG_CYCLE) to the mobile station 2 in an ATTACH_RESPONSE message. But if the packet-switched network 4 does not support the suggested paging period, it selects a paging period available in the packet-switched network 4 and sends information about the selected paging period in a response message. After the paging period has been selected, this value is saved in the mobile station 2 and the packet-switched network 4. In connection with the attach signalling, the mobile station 2 is also notified in which time slots paging messages are sent to the mobile station 2.

Figure 3:
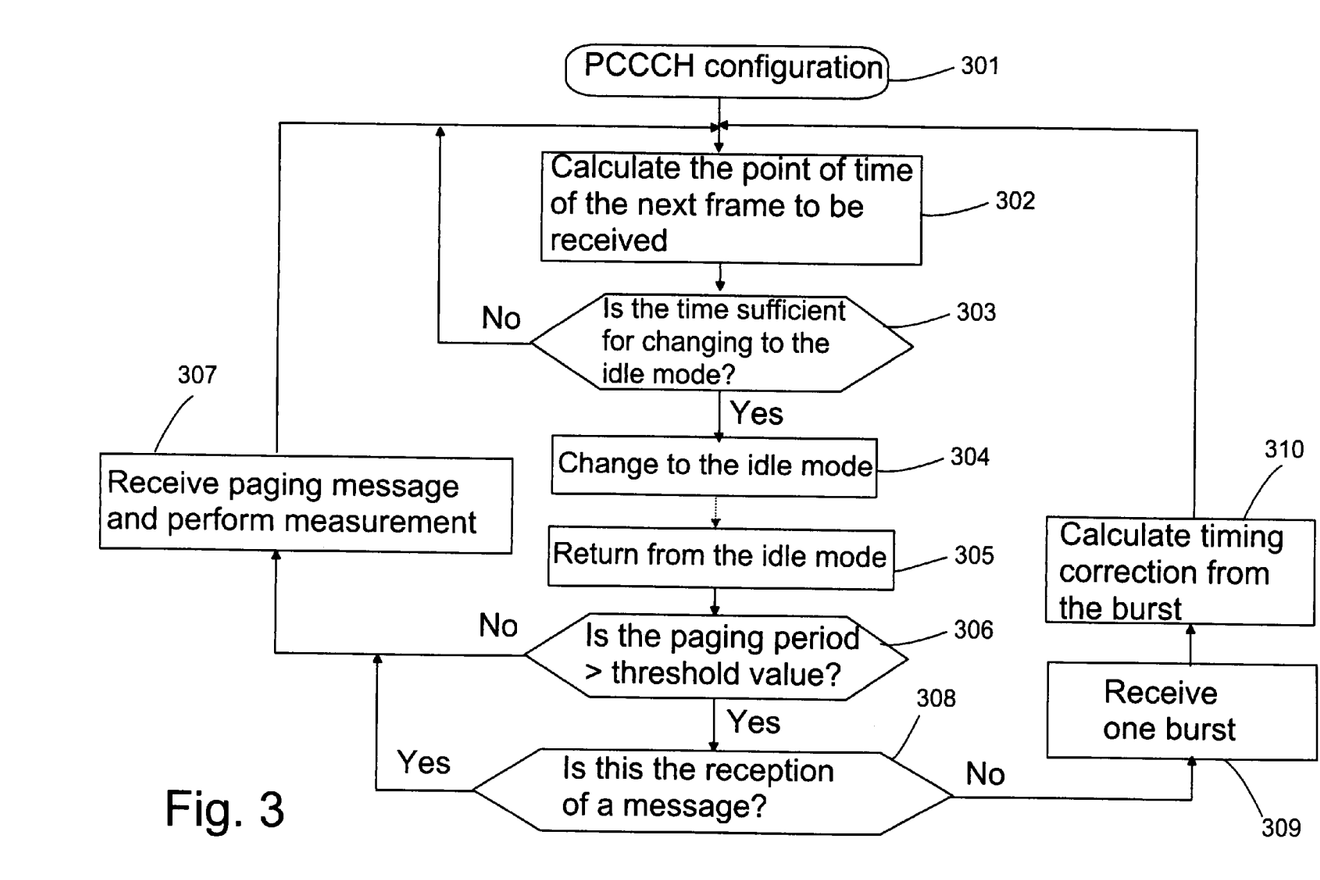
FIG. 3 illustrates the functioning of a method according to the first preferred embodiment of the invention as a simplified flowchart.
Figure 5B:
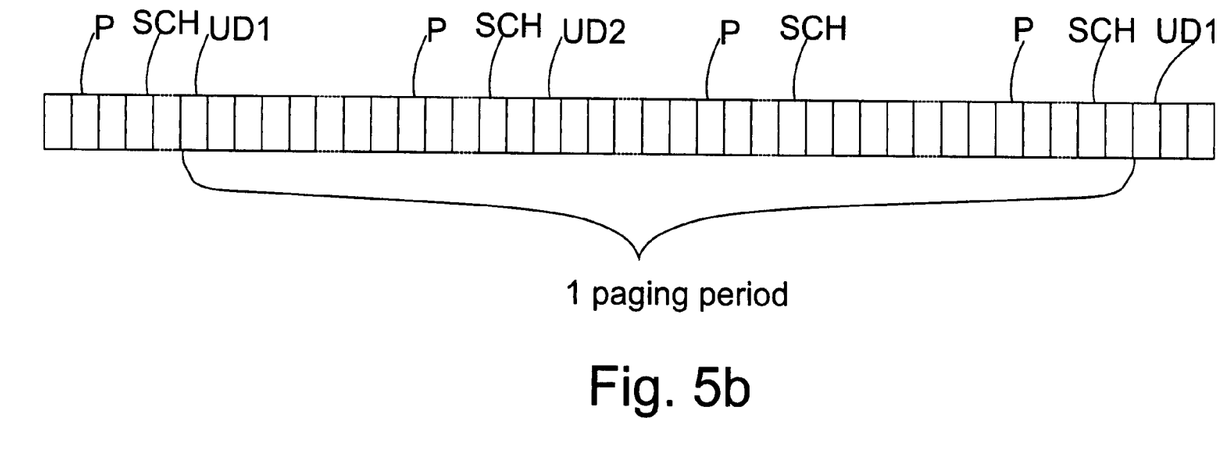
FIG. 5b illustrates the timings of the method according to the second preferred embodiment of the invention by means of multiframes.

In the following, the operation of the method according to the first preferred embodiment of the invention in the mobile station 2 will be described in more detail with reference to the flow chart of FIG. 3 and the frames of FIG. 5b. It is assumed that the mobile station 2 has performed the attachment to the mobile communication network, and a paging period has been selected for the mobile station 2. After the attachment, the mobile station 2 has received from the packet-switched network, preferably in the PCCCH channel, information about the location of the paging message to be sent to the mobile station 2 in the multiframe (block 301). This radio block used by the PCCCH channel is marked with the letter P in FIG. 5b. In addition, the marking UD1 is used in FIG. 5b to denote the paging messages, which are intended for reception by the group to which the mobile station 2 belongs. Correspondingly, paging messages intended for other groups are marked UD2 in FIG. 5b.

When a mobile station 2 changes from the active mode to the standby mode, the digital signal processing unit 32 preferably calculates how many time slots there are before the next reception time slot allocated to the mobile station 2, or when the next paging message UD1 will be sent in the packet-switched network to the mobile station 2 (block 302). The digital signal processing unit 32 examines whether the time before the next frame is so long that it is possible to set the mobile station 2 in the idle mode (block 303). If the time is not sufficient for changing to the idle mode, the mobile station stays in the standby mode for receiving the information to be sent in the next reception time slot. If the time is sufficient for setting the mobile station 2 to the idle mode, the mobile station 2 is set to the idle mode.

In order to start the idle mode, a time control is set by means of a timer T1 (FIG. 6) in connection with the digital signal processing unit 32, for example. The purpose of the time control is to interrupt the idle mode in order to perform synchronization, as will be explained later in this specification. After this, the mobile station 2 is set to the idle mode (block 304), whereby the digital signal processing unit 32 changes to an idle mode, and the input voltage is switched off from the high-frequency part and the second oscillator O2, for instance. In the idle mode, the digital signal processing unit 32 does not execute the program code, but the timer T1, for example, is in operation. In the idle mode of the mobile station 2, the required timings are created with the first oscillator O1, the frequency of which is, for example, 32 kHz. The maximum length of the idle mode in this preferred embodiment is nine multiframes, whereby it is also possible to keep the mobile station 2 synchronized to the packet-switched network by means of the first oscillator 01, in a manner known as such.

Obviously the numerical values presented here only serve as examples which illustrate the invention, but do not constitute a limitation thereof.

After the time set in the time control has expired, the timer T1 creates an interrupt signal or a corresponding excitation to the digital signal processing unit 32. As a result of this, the digital signal processing unit changes to the normal operation mode (block 305) in order to perform the following measures, among other things. The digital signal processing unit 32 examines (block 306) whether the paging period in use is longer than the threshold value set in advance, preferably nine multiframes in a packet-switched network according to the GPRS system.

If the paging period is shorter or as long as the threshold value, the digital signal processing unit 32 sets the high-frequency part of the mobile station in operation for receiving the paging message UD1 intended for the mobile station 2 in a manner known as such (block 307). This includes starting the second oscillator O2, for instance. The mobile station 2 can be kept synchronized to the packet-switched network preferably so that the burst used in the transmission of the paging message UD1 comprises a training sequence in a known manner, and the timing error can be calculated in the digital signal processing unit 32 by examining the training sequence. The training sequence preferably comprises 26 bits, which are sent in the middle of the burst. In addition to the reception of the paging message, the mobile station 2 can perform signal strength measurements, for example. After this, the operation continues from block 302.

If the paging period is set longer than the threshold value, it is examined in block 308 if the idle mode has been interrupted because the paging period has expired and a paging message UD1 is coming to the mobile station 2. Then the operation moves to block 307, reception of the paging message UD1. If the paging period has not ended yet, the burst is received in the PCCCH channel P (block 309). The digital signal processing unit 32 performs calculation needed for the correction of timing errors (block 310) from the training period of this burst. The timing of the mobile station 2 is changed according to the result of the calculation. After this, operation continues from block 302.

The operations described above can also be largely implemented in the application programs of the signal processing unit 32. Some changes may also be needed in the algorithms and filters used in the calculation of the timing error, because in the prior art mobile stations it is assumed that the error is calculated on the basis of the reception of two or four bursts.

Figure 4:
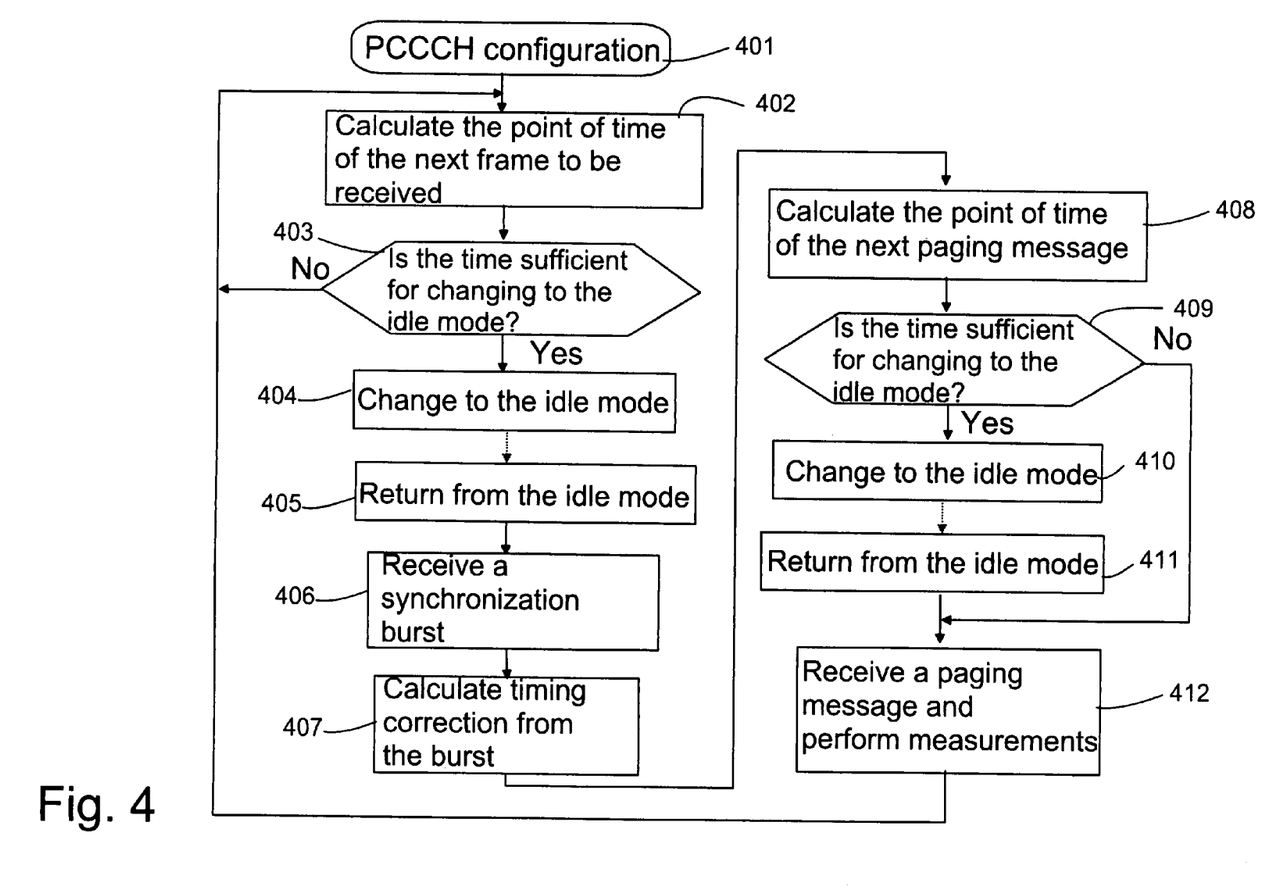
FIG. 4 illustrates the functioning of a method according to the second preferred embodiment of the invention as a simplified flowchart.

The operation of a method according to another preferred embodiment of the invention will be described in the following with reference to the flow chart in FIG. 4. The operation of blocks 401, 402, 403, 404 and 405 largely corresponds to the operation of the corresponding blocks 301, 302, 303, 304 and 305. However, in block 404, a longer period of time is set as the length of the idle mode than in the method according to the first embodiment. In order to calculate the length of the idle state, it has to be discovered when the next paging message UD1 will be sent and in which frame a synchronization burst will be sent in the SCH channel before this paging period. In addition, the maximum inaccuracy of the first oscillator O1 must be taken into account and the length of this idle state must be shortened to such an extent that the mobile station 2 changes to the reception of the synchronization burst in time in spite of the inaccuracy. When the transmission moment of the synchronization burst is known, time control can be set. In the next step, the mobile station 2 changes to the idle state.

The idle state ends when the time control has ended in block 405, whereby the mobile station 2 is set to the reception mode. Then the mobile station 2 attempts to detect the transmission of a synchronization burst (block 406). If the reception of the synchronization burst SCH succeeds, the mobile station 2 can be resynchronized to the multiframe of the packet-switched network (block 407). After this, the digital signal processing unit 32 calculates the time of the next paging message UD1 (block 408) and examines in block 409 if the time is sufficient for changing to the idle mode. If the time is long enough for changing to the idle mode, the digital signal processing unit 32 starts the time control and sets the mobile station in the idle mode (block 410). If the time is not sufficient for changing to the idle mode, the mobile station stays in the normal standby mode until the reception of the next paging message.

If the mobile station was set in the idle mode in block 410 above, the idle mode is stopped by time control for the duration of the reception of the burst to be sent in the PCCCH channel P (block 411), as was described earlier in this specification. Block 412 represents the reception of the paging message and the performance of the measurements.

The functional features described above can be largely implemented by means of software in the currently known mobile stations 2.

This method according to the second preferred embodiment of the invention enables reducing power consumption even more than the method according to the first embodiment of the invention, especially when using longer paging periods, because the idle mode is then interrupted less frequently.

In the following, the operation of the method according to still another preferred embodiment of the invention in the mobile station 2 will be described in more detail. This preferred embodiment is based on the idea that the selection of the paging period is affected by the strength of the received signal of the base station BTS with which the mobile station 2 is in connection. The mobile station 2 begins to perform measurements of the strength of the received signal of the base station advantageously after the packet idle mode is configured at the attachment.

It is assumed that the mobile station 2 has performed the attachment to the mobile communication network, and a paging period has been selected for the mobile station 2. Further, it is assumed that there are two different paging periods from which the paging period can be selected. However, this invention is not restricted to two different paging periods but it can also be applied in systems where more than two paging periods can be used. One of the selectable paging periods can be defined as a default paging period, which is selected in connection with the attachment of the mobile station 2 to the mobile communication network.

The signal strength measurements are preferably performed by taking samples from the received signal at regular intervals. The samples are taken e.g. during the PBCCH-frames P (or BCCH-frames) which the base station transmits. The measured signal strength values are then filtered by using a suitable filter to define a representation of the signal, e.g. an average signal strength or a variance of samples taken from the received signal. Also so called C value which will be measured by a mobile station of the GPRS-system can be used to define the representation of the signal. The average signal level is preferably a running average value, i.e. the average signal strength value is calculated by using the newest measurement value and a certain number (N) of previous values, which are stored in the mobile station 2. The mobile station 2 comprises a circular buffer in which the average values are stored after every measurement. When the buffer is full, the newest average value is written on the oldest one.

It is not necessary to perform the signal strength measurement every time the base station transmits the PBCCH-frame P. For example, the measurement interval, i.e. time between two successive measurements, can be defined the same as the paging period. In addition to that a maximum measurement interval could be defined, wherein the measurement is performed e.g. once per paging period, if the paging period is not longer than said maximum measurement interval, or the measurement interval is substantially the same as said maximum measurement interval, if the paging period is longer than said maximum measurement interval. It is also possible that the mobile station uses more than one sample during the frame and calculates an average value of received signal strength by using those samples. This average value is then used as the received signal strength value for that frame.

The parameters related to the filtering need to be defined in practical implementations of the present invention. These parameters include the length of the filter and values of the filter taps. The timing window, i.e. the number of previous values which are used in the filtering, is dependent on the measurement interval of the received signal. For example, if the reference signal is BCCH carrier and maximum measurement interval is defined as 4 s, the length is related to Min(current paging period, 4 s) because only one sample/Min(current paging period, 4 s) is taken from the BCCH carrier. In this embodiment of the present invention also received signal level window is defined for tracking the magnitude of changes in the representation of the received and measured signal. This window defines the upper and lower limits within which the representation of the signal shall be in order to activate a change to a longer paging period, if not longest already, or in order to activate a change to a shorter paging period, if not shortest already, when the limits are crossed. The upper and lower limits are preferably defined by one ore more threshold values (in dB) above and under the previous value of the representation of the signal.

The threshold values may be changed according to the reception level of the signal and/or according to the quality of the reception of the mobile station 2. In a situation where more than two different paging periods are supported there may be several steps towards the longest or towards the shortest paging period. Therefore in such a case the threshold values also depend on the length of the current paging period. If more than two paging periods are supported the amount of the change could also be defined for the changes of the paging period.

If the measurement is to be performed when the mobile station 2 is in the idle mode, at least part of the functions of the mobile station 2 have to be set in operation for the measurement. This can advantageously be implemented so that the digital signal processing unit 32 calculates the time when the base station BTS transmits PBCCH-frames. Then, the digital signal processing unit 32 starts a timer which informs the digital signal processor 32 of the correct measurement time. After the timer is started the mobile station 2 can be set to the idle mode. Also the digital signal processor can set itself to idle mode. Therein when the timer reaches the set timing value it will cause an interrupt to the digital signal processor 32 and the digital signal processor is set to normal operating mode.

To perform the measurement, at least the receiver RX of the high-frequency part is powered on. The digital signal processor 32 can now measure the received signal strength e.g. from the output of the Analog-to-Digital Converter 19 and calculate a new average value using at least part of the previously calculated and stored average values. When the calculation is performed the newest average value is compared with the stored average values. If the difference between the newest average value and any of the stored average values is greater than a first threshold value X, the paging period is not changed. If the difference between the newest average value and all of the stored average values is not greater than said first threshold value X and the present paging period is not the longest one, the change of the paging period is triggered. Now the mobile station 2 and the network begins to negotiate for a longer paging period.

When the longer paging period is selected for the idle mode, the mobile terminal according to this advantageous embodiment operates as follows. The mobile terminal preferably performs the signal strength measurements periodically during the PBCCH-frames P (or BCCH-frame) and an average signal strength is calculated, preferably as a running average value as mentioned above. Again a certain number (M) of previously calculated average values are stored in a circular buffer of the mobile station 2. The mobile station 2 can use the same circular buffer than before, or it can use another circular buffer for the longer paging period. Now, the number of the saved values preferably is less than if shorter paging period were selected, i.e. M<N. The values of the circular buffer are initialized by using the old N average values which were calculated during the previous (shorter) paging period, if available.

Every time the average value is updated it is checked whether the new average value of the signal strength differs from any of the stored average values more than a second threshold value. If the new average value is within said second threshold value from the stored values, the paging period is not changed. However, if there is even one value which differs from the new value more than said second threshold value, the change of the paging period is triggered. Now, the mobile station 2 and the network begin to negotiate for a shorter paging period.

The first threshold value X defines the size of the received signal strength window during the first paging period. The second threshold value Y defines the size of the received signal strength window during the second paging period. The size of the windows may vary according to the quality (e.g. pseudo bit error rate) and the level (e.g. in dBm) of the reception. The better the quality or the higher the level, the bigger the threshold value X, Y, may be. There can also be more than two paging periods to be selected and more than two threshold values defined.

The method can also comprise a hysteresis time to avoid a situation in which the mobile station 2 begins to oscillate between two paging periods. This could happen if the signal strength is varying. This can be avoided or at least limited in such a way that every time the paging period is changed the mobile station 2 waits the hysteresis time before is starts to perform the comparison of the new value and the stored values. For example, the comparison is started when 2*N measurements are performed after the last change of the paging period. The value of the hysteresis time can also be variable. The value may vary according to the previous packet transfer mode (packet transfer/idle) of the mobile station 2.

When a mobile station 2 changes from the active mode to the idle mode first time after attaching to the network, the mobile station 2 preferably selects the default paging period and starts to negotiate with the network for the paging period. When a mobile station 2 changes from the active mode to the idle mode and the mobile station 2 has already been in idle mode, the mobile station 2 checks which paging period was previously in use when the mobile station 2 was in the idle mode and the mobile station 2 selects the previously used paging period.

The circular buffer(s) can be implemented e.g. in the memory means 37 of the mobile station 2, in the memory 26 of the Application Specific Integrated Circuit 36 or as a separate memory block, which is known as such.

When the paging period is changed and the quality of the reception substantially decreases, then preferably the previous paging period is restored. Quality measures are preferably based on paging blocks for the mobile station 2 or BCCH/PBCCH frame reception.

The method presented above has an advantage that it takes into account the quality and strength of the received signal wherein in good signal conditions the paging period can be increased and further power savings achieved because the mobile station 2 can stay longer in idle mode.

The method presented above is preferably initialized every time when the mobile station 2 enters the idle mode. The method can be disabled if the network does not support the negotiation of the paging period parameters. It is also possible that the user of the mobile terminal can enable and disable the method.

It is also possible to use other criteria than the signal strength of the received signal in connection with the selection of the paging period with the above described another preferred embodiment of the invention. Such other criteria could be, for example, average number of errors or variance. The variance can be calculated, for example, by using the received signal strength of N previous paging blocks, or by using N previous samples which are taken e.g. during the PBCCH-frames P (or BCCH-frames). Further, it is possible to calculate the variance by averaging variances of paging block bursts.

There is still another alternative embodiment of the invention which allows the user of the mobile station to select the paging period. For example, two different operating modes are defined and the user may select the correct one. Those operating modes could comprise e.g. "in office" and "on the road". The first one is normally quite stable environment, where the cell coverage is normally good. This means that the mobile station will with a high probability receive correctly all the blocks intended to that mobile station. When the downlink connection is good the paging period can be increased. This will reduce the power consumption of the mobile station.

The other operating mode is intended for environments where signal conditions are continuously changing e.g. because the movement of the mobile station. This causes changes to the reception conditions and probably some of the pagings are missed due to the erroneous reception. In this kind of environments there is a limit for the largest paging period, which is smaller than in the office environment. The smaller paging period will increase the power consumption but this needs to be done to ensure reliable idle mode operation.

The user controlled paging period can also be related to preferred service. For example, when circuit switched calls are preferred, a smaller paging period is selected and when the packer transfer is preferred, a larger paging period is selected.

The power saving achieved with the method according to the invention can be assessed by using the following calculations. The following assumptions have been made in the calculations:

| | |
|---|---|
| reception of a paging message: | 4 TDMA frames |
| reception of a burst from the PBCCH/PCCCH channel: | 1 TDMA frame |
| exiting the idle mode: | 1 TDMA frame |
| performing the measurements/paging period: | 5 TDMA frames |

-continued

| | |
|---|---|
| the FDDH, SCH or BCCH frames of the adjacent cells are not received | |

In a prior art method, when the paging period is nine multiframes, the non-idle time of the mobile station is calculated as follows:

| | | |
|---|---|---|
| 1. | exiting the idle mode: | 1 frame |
| 2. | reception of a paging message: | 4 frames |
| 3. | performing the measurements: | 5 frames |
| 4. | changing to the idle mode for | 458 frames |
| The previous steps are repeated eight times during 64 multiframes, whereby the mobile station is not in the idle mode for the duration of 80 (= 8*(1 + 4 + 5)) frames. | | |

A reference value for the method according to the first preferred embodiment of the invention is obtained as follows:

| | | |
|---|---|---|
| 1. | exiting the idle mode: | 1 frame |
| 2. | reception of a paging message: | 4 frames |
| 3. | performing the measurements: | 5 frames |
| 4. | changing to the idle mode for the duration of | 458 frames |
| 5. | exiting the idle mode: | 1 frame |
| 6. | reception of a PCCCH burst and calculation of a timing correction | 1 frame |
| 7. | changing to the idle mode for the duration of | 466 frames |
| 8. | the steps 5, 6 and 7 are repeated until the end of the paging period, after which the steps 1 to 4 are also repeated | |

The reception of the paging message and the measurements (1+4+5=10 frames) are carried out only once at the beginning of each paging period, after which the mobile station exits the idle mode only for determining the timing correction after each nine multiframes. During the whole period of 64 multiframes, timing corrections are preferably carried out seven times, which means 14 frames (=7*(1+1)). The whole time during which the mobile station is not in the idle mode during the period of 64 multiframes is thus 24 frames, which is a considerably shorter time than that of the prior art mobile station. The calculations above were based on the fact that the reception and decoding of a paging message require the reception of four bursts. If the reception and decoding of the paging message can be carried out from two bursts, the corresponding times are 64 frames in a prior art receiver and 22 frames in a mobile station applying a method according to the first preferred embodiment of the invention.

A reference value for the method according to the second preferred embodiment of the invention is obtained as follows:

| | | |
|---|---|---|
| 1. | exiting the idle mode: | 1 frame |
| 2. | reception of a paging message: | 4 frames |
| 3. | performing the measurements: | 5 frames |
| 4. | changing to the idle mode for the duration of | 3316 frames |
| 5. | exiting the idle mode: | 1 frame |
| 6. | reception of a SCH burst and calculation of a timing correction | 1 frame |

The reception of the paging message and the measurements (1+4+5=10 frames) are carried out only once at the beginning of each paging period, after which the mobile station exits the idle mode only a little time before the end of the paging period for determining the timing correction. The whole time during which the mobile station is not in the idle mode during the period of 64 multiframes is thus 12 frames, which is even a shorter time than that of a mobile station applying a method according to the first embodiment of the invention.

In a GPRS system, the maximum period between measurements can be set as four seconds, for example. Then the values mentioned above become somewhat different. A reference value for the method according to the first preferred embodiment is then obtained as follows:

| | | |
|---|---|---|
| 1. | exiting the idle mode: | 1 frame |
| 2. | reception of a paging message: | 4 frames |
| 3. | performing the measurements: | 5 frames |
| 4. | changing to the idle mode for the duration of | 458 frames |
| 5. | exiting the idle mode: | 1 frame |
| 6. | reception of a PCCCH burst and calculation of a timing correction | 1 frame |
| 7. | changing to the idle mode for the duration of | 466 frames |
| 8. | exiting the idle mode: | 1 frame |
| 9. | measurements and the reception of one PCCCH burst: | 8 frames |
| 10. | changing to the idle mode for the duration of | 459 frames |
| | Steps 5 to 10 are repeated three times during 64 multiframes. At the last time in step 10, the idle mode is nevertheless shorter than 459 frames. The above gives a total of 10 + 3*(1 + 1 + 1 + 8) = 43 frames, during which the mobile station is not in the idle mode, when the reception of the paging period is carried out from four bursts. | |

Correspondingly, a reference value for the method according to the second preferred embodiment of the invention is obtained in this situation as follows:

| | | |
|---|---|---|
| 1. | exiting the idle mode: | 1 frame |
| 2. | reception of a paging message: | 4 frames |
| 3. | performing the measurements: | 5 frames |
| 4. | changing to the idle mode for the duration of | 856 frames |
| 5. | exiting the idle mode: | 1 frame |
| 6. | measurements without the reception of a PCCCH burst: | 8 frames |
| 7. | changing to the idle mode for the duration of | 857 frames |
| 8. | exiting the idle mode: | 1 frame |
| 9. | reception of a SCH burst and calculation of a timing correction | 1 frame |

Steps 5, 6 and 7 are repeated three times during 64 multiframes. At the last time in step 7, the idle mode is nevertheless shorter than 857 frames. The above gives a total of 10+3*(1+8)+1+1=39 frames, during which the mobile station is not in the idle mode, when the reception of the paging message is carried out from four bursts.

Even in these latter situations, a mobile station according to the present invention is in a not-idle state for a time, which is about half of the corresponding time in the prior art mobile stations.

The present invention is not limited to the above described embodiments only, but it can be varied within the scope defined by the attached claims.

The invention claimed is:

1. A method for reducing the power consumption of a mobile station connected to a packet-switched network, in which packet-switched network information is transmitted in the form of data frames, the method comprising:

defining at least two different paging periods, and selecting a paging period for an idle mode in the mobile station on the basis of received signal strength;

sending paging messages essentially at the intervals of said paging period to the mobile station to enable to synchronize the mobile station with the packet-switched network;

setting the mobile station in the standby mode at least for the time of the reception of paging messages, and after the reception of the paging message;

setting the mobile station, which is in the standby mode, to the idle mode, in which idle mode part of the functions of the mobile station are set in one of the following states: the power saving mode; switched off, wherein the method further comprises changing the mode of operation of the mobile station from the idle mode to the standby mode according to any of the following alternatives: at intervals during the paging period to receive information transmitted in the packet-switched network for maintaining synchronization to the packet-switched network; or at the end of the paging period for resynchronizing the mobile station to the packet-switched network.

2. A method according to claim 1, comprising performing the selection of the paging period on the basis of running average of the received signal strength.

3. A method according to claim 1, further comprising at least the following:

defining a first threshold value, defining a maximum paging period and a minimum paging period, calculating a representation of the received signal by using the received signal strength, comparing said representation of the received signal with one or more previously calculated representations of the received signal, increasing the paging period, if the comparison indicates that the difference between the representation of the received signal and all of said one or more previously calculated representations of the received signal lies within said first threshold value and if current paging period is shorter than said maximum paging period;

decreasing the paging period, if the comparison indicates that the difference between the representation of the received signal and any of said one or more previously calculated representations of the received signal is greater than said first threshold value and if current paging period is longer than said minimum paging period.

4. A method according to claim 1, further comprising defining the selection of the paging period by the user of the mobile terminal.

5. A method according to claim 1, further comprising controlling in the idle mode the timing functions of the mobile station by using a first oscillator, wherein the time for changing from the idle mode to the standby mode is affected at least partly by the frequency stability of the first oscillator.

6. A method according to claim 5, further comprising at least the following steps:

specifying a synchronization period for the mobile station on the basis of the frequency stability of the first oscillator, receiving a paging message, setting the mobile station in the idle mode, specifying the time of reception of the next paging message, comparing the specified synchronization period with the specified time of reception, examining the result of the comparison to determine if the synchronization period is at least as long as the time before the next time of reception of a paging message, wherein the method comprises setting the idle mode to end essentially immediately before the time of reception of the next paging message, or if the synchronization period is shorter than the time before the time of reception of the next paging message, wherein the method comprises setting the idle mode to end before the specified synchronization time has expired, performing the synchronization, and repeating said setting, specifying, comparing and examining, and repeating at least said receiving, setting, specifying, comparing and examining in connection with the reception of each paging message.

7. A method according to claim 6, comprising forming the data frame of bursts, and forming multiframes of a certain length of the data frames, whereby the method further comprises specifying the synchronization period as a number of multiframes.

8. A method according to claim 7, comprising forming the multiframe of 52 data frames, specifying the paging period as 64 multiframes, and specifying the synchronization period as nine multiframes.

9. A method according to claim 7, comprising sending synchronization bursts in data frames, and performing the resynchronization by receiving said synchronization bursts.

10. A method according to claim 1, comprising using a GPRS packet-switched network as the packet-switched network.

11. A system, which comprises:

a packet-switched network, at least one mobile station having a data transfer connection with the packet-switched network, means for sending information in the form of data frames between the mobile station and the packet-switched network, means for defining at least two different paging periods, and selecting a paging period for the idle mode in the mobile station on the basis of received signal strength, whereby paging messages are arranged to be sent essentially at the intervals of said paging period to the mobile station to enable to synchronize the mobile station with the packet-switched network, means for setting the mobile station to the standby mode at least for the time of the reception of the paging messages means for setting the mobile station, which is in the standby mode, to the idle mode after the reception of the paging message, and means for setting some of the functions of a mobile station in the idle mode to one of the following states:

the power saving mode, switched off, means for changing the mode of operation of a mobile station, which is in the idle mode, from the idle mode to the standby mode, wherein the means for changing the mode of operation of a mobile station are adapted to change the mode of operation according to any of the following alternatives: at intervals during the paging period to receive information transmitted in the packet-switched network for maintaining synchronization to the packet-switched network, or at the end of the paging period to receive information transmitted in the packet-switched network for performing a resynchronization to the packet-switched network.

12. A system according to claim 11, comprising in that the mobile station comprises a first oscillator for controlling the timing functions of the mobile station in the idle mode, whereby the time for changing from the idle mode to the standby mode is affected at least partly by the frequency stability of the first oscillator.

13. A system according to claim 12, comprising in that the mobile station also comprises:

means for specifying the synchronization period on the basis of the frequency stability of the first oscillator, means for receiving a paging message, means for setting the mobile station to the idle mode, means for specifying the time of reception of the next paging message, comparison means for comparing the specified synchronization period with the specified time of reception, means for setting the ending time of the idle mode on the basis of the comparison carried out with said comparison means, said means for setting the ending time of the idle mode being adapted to examine the result of the comparison to determine if the synchronization period is at least as long as the time before the next time of reception of a paging message, wherein the idle mode has been set to end essentially immediately before the time of reception of the next paging message, or if the synchronization period is shorter than the time before the time of reception of the next paging message, wherein the idle mode has been set to end before the specified synchronization time has expired, the system is adapted to perform the synchronization and to set the mobile station to the idle mode after the synchronization.

14. A system according to claim 13, wherein the data frame comprises bursts, and multiframes of a certain length comprises the data frames, whereby a number of multiframes specifies the synchronization period.

15. A system according to claim 14, comprising in that the multiframe is formed of 52 data frames, the paging period is 64 multiframes, and that the synchronization period is nine multiframes.

16. A system according to claim 13, wherein said means for sending information are adapted to send synchronization bursts in data frames, whereby the system is adapted to receiving said synchronization bursts to perform the resynchronization.

17. A system according to claim 11, wherein the packet-switched network is a GPRS packet-switched network.

18. A mobile station comprising:

means for establishing a data transfer connection to the packet-switched network, means for defining at least two different paging periods, and selecting a paging period for an idle mode in the mobile station on the basis of received signal strength;

a receiver for receiving paging messages which are sent essentially at the intervals of said paging period from the packet-switched network to the mobile station to enable to synchronize the mobile station with the packet-switched network, means for setting the mobile station to the standby mode at least for the time of the reception of the paging messages, means for setting the mobile station, which is in the standby mode, to the idle mode after the reception of the paging message, and means for setting some of the functions of a mobile station in the idle mode to one of the following states:

the power saving mode, switched off, means for changing the mode of operation of a mobile station, which is in the idle mode, from the idle mode to the standby mode, wherein the means for changing the mode of operation of a mobile station are adapted to change the mode of operation according to one of the following alternatives: at intervals during the paging period to receive information transmitted in the packet-switched network for maintaining synchronization to the packet-switched network when the mobile station is synchronized to the packet-switched network, or at the end of the paging period to receive information transmitted in the packet-switched network for performing synchronization to the packet-switched network again when the mobile station is not synchronized to the packet-switched network.

* * * * *